(12) United States Patent
Sinha et al.

(10) Patent No.: US 10,275,697 B2
(45) Date of Patent: Apr. 30, 2019

(54) METHOD FOR AUTOMATICALLY TRIGGERING DATA SHARE EVENT BETWEEN SENDER DEVICE AND RECEIVER DEVICE

(71) Applicant: Samsung Electronics Co., Ltd., Suwon-si, Gyeonggi-do (KR)

(72) Inventors: Ritesh Sinha, Jhumritelaiya (IN); Vipin Tiwari, Dewas (IN); Santosh Pallav Sahu, Ghaziabad (IN); Manoj Kumar, New Delhi (IN); Tasleem Arif, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/443,225

(22) Filed: Feb. 27, 2017

(65) Prior Publication Data
US 2017/0255851 A1    Sep. 7, 2017

(30) Foreign Application Priority Data

Mar. 2, 2016   (IN) .............................. 201641007356

(51) Int. Cl.
| | | |
|---|---|---|
| *G06F 7/10* | (2006.01) | |
| *G06K 7/14* | (2006.01) | |
| *G06K 19/06* | (2006.01) | |
| *H04L 29/06* | (2006.01) | |
| *H04W 4/21* | (2018.01) | |
| *H04W 12/04* | (2009.01) | |
| *G06K 7/10* | (2006.01) | |

(52) U.S. Cl.
CPC ..... *G06K 19/06037* (2013.01); *G06K 7/1095* (2013.01); *G06K 7/1413* (2013.01); *G06K 7/1417* (2013.01); *G06K 19/06028* (2013.01); *H04L 63/083* (2013.01); *H04W 4/21* (2018.02); *H04W 12/04* (2013.01)

(58) Field of Classification Search
CPC ........................................................ G06K 19/06
USPC ................................ 235/462.1, 375; 705/44
See application file for complete search history.

(56) References Cited

U.S. PATENT DOCUMENTS

| | | |
|---|---|---|
| 7,124,953 B2 | 10/2006 | Anttila et al. |
| 9,143,936 B2 | 9/2015 | Kim |

(Continued)

FOREIGN PATENT DOCUMENTS

| | | |
|---|---|---|
| IN | 253952 | 3/2008 |
| IN | 249577 | 10/2009 |

(Continued)

OTHER PUBLICATIONS https://forthemommas.com/articles/how-does-the-target-cartwheel-app-work Jan. 6, 2014.*
Motorola Migrate (Retrieved from https://accounts.motorola.com).

*Primary Examiner* — Allyson N Trail
(74) *Attorney, Agent, or Firm* — Jefferson IP Law, LLP

(57) ABSTRACT

Embodiments herein provide a method for automatically triggering a data share event between a sender device and a receiver device. The method includes generating a unique code including at least one data item to be shared with the receiver device, wherein the unique code is encoded with at least one parameter associated with the sender device. Further, the method includes sharing the unique code with the receiver device to automatically trigger the data share event.

20 Claims, 13 Drawing Sheets

(56) References Cited

U.S. PATENT DOCUMENTS

| | | | | |
|---|---|---|---|---|
| 2011/0101086 A1* | 5/2011 | Yach | ............... | G06Q 10/10 |
| | | | | 235/375 |
| 2012/0084391 A1* | 4/2012 | Patel | ............... | G06Q 20/0453 |
| | | | | 709/217 |
| 2013/0144697 A1* | 6/2013 | Gao | ............... | G06Q 30/0218 |
| | | | | 705/14.17 |
| 2014/0013118 A1* | 1/2014 | Kumai | ............... | H04L 9/3268 |
| | | | | 713/175 |
| 2014/0379532 A1* | 12/2014 | Agasti | ............... | G06Q 30/0641 |
| | | | | 705/27.1 |
| 2015/0341397 A1* | 11/2015 | Semturs | ............... | G06Q 50/01 |
| | | | | 715/753 |
| 2016/0117487 A1* | 4/2016 | Amacker | ............... | G06T 11/00 |
| | | | | 235/375 |
| 2016/0212178 A1* | 7/2016 | Zhang | ............... | H04L 65/1066 |
| 2017/0105037 A1* | 4/2017 | Svendsen | ............... | H04N 21/42204 |

FOREIGN PATENT DOCUMENTS

| | | |
|---|---|---|
| IN | 4694/CHENP/2013 | 9/2014 |
| WO | 2012/071174 A | 5/2012 |

\* cited by examiner

METHOD FOR AUTOMATICALLY TRIGGERING DATA SHARE EVENT BETWEEN SENDER DEVICE AND RECEIVER DEVICE

CROSS-REFERENCE TO RELATED APPLICATION(S)

This application claims the priority under 35 U.S.C. § 119(a) of an Indian patent application filed on Mar. 2, 2016 in the Indian Patent Office and assigned Serial No. 201641007356, the entire disclosure of which is hereby incorporated by reference.

TECHNICAL FIELD

The embodiments herein generally relate to data sharing systems. More particularly, related to a mechanism for automatically triggering a data share event between a sender device and a receiver device.

BACKGROUND

Portable electronic devices (such as gaming devices, smart phones, tablets, phablets, media players, digital assistants, electronic book reader devices, or the like consumer electronic devices, wearable devices and so on) are becoming increasingly popular. It is generally known that the contents present in various applications in the electronic devices can be shared through Bluetooth, Wireless-Fidelity (Wi-Fi), messenger or social media websites. The content in the applications has to be selected for sharing the selected content. For example, in a gallery application, image(s) has to be selected and the selected images are shared.

In order to share content distributed among multiple applications in the electronic device, the content has to be selected from each application. This requires a user to undergo an extensive number of steps. More particularly, when a large number of contents have to be shared then the user has to undergo multiple steps to separately select content in each application available at different locations which may become cumbersome and time consuming for the user thereby decreasing the overall user experience.

In the conventional systems and methods, the user is busy performing their daily tasks, and if the user is migrating from one electronic device to another electronic device then, it will be a tedious job to transfer backup data such as images, videos, messages, contacts, documents, or the like to another electronic device. The conventional systems and methods do not provide an ability to the user to select list of data items to be transferred.

SUMMARY

The principal object of the embodiments herein is to provide a mechanism for automatically triggering a data share event between a sender device and a receiver device.

Another object of the embodiments herein is to provide a mechanism for generating, by the sender device, a unique code including at least one data item to be shared with the receiver device, where the unique code is encoded with at least one parameter associated with the sender device.

Another object of the embodiments herein is to provide a mechanism for sharing, by the sender device, the unique code with the receiver device to automatically trigger the data share event.

Yet another object of the embodiments herein is to provide a mechanism for recognizing, at the receiver device, the at least one data item encoded in the unique code, where the at least one data item is stored at the sender device.

Yet another object of the embodiments herein is to provide a mechanism for automatically triggering, by the receiver device, the data share event to receive the at least one data item from the sender device. Accordingly the embodiments herein provide a method for automatically triggering a data share event between a sender device and a receiver device. The method includes generating a unique code comprising at least one data item to be shared with the receiver device, where the unique code is encoded with at least one parameter associated with the sender device. Further, the method includes sharing the unique code with the receiver device to automatically trigger the data share event.

Accordingly the embodiments herein provide a method for automatically triggering a data share event between a sender device and a receiver device. The method includes recognizing at least one data item encoded in a unique code, wherein the at least one data item is stored at the sender device. Further, the method includes automatically triggering the data share event to receive the at least one data item from the sender device.

Accordingly the embodiments herein provide a sender device for automatically triggering a data share event with a receiver device. The sender device includes a code unit configured to generate a unique code including at least one data item to be shared with the receiver device, where the unique code is encoded with at least one parameter associated with the sender device. Further, the sender device includes a controller unit configured to share the unique code with the receiver device to automatically trigger the data share event.

Accordingly the embodiments herein provide a receiver device for automatically triggering a data share event with a sender device. The receiver device includes a code unit configured to recognize at least one data item encoded in a unique code, wherein the at least one data item is stored at the sender device. Further, the receiver device includes a controller unit configured to automatically triggering the data share event to receive the at least one data item from the sender device.

Accordingly the embodiments herein provide a system for automatically triggering a data share event between a sender device and a receiver device. The system includes the sender device configured to generate a unique code comprising at least one data item to be shared with the receiver device. Further, the system includes the receiver device configured to recognize the at least one data item encoded in the unique code. Further, the receiver device configured to automatically trigger the data share event to receive the at least one data item from the sender device.

Accordingly the embodiments herein provide a computer program product comprising computer executable program code recorded on a computer readable non-transitory storage medium, the computer executable program code when executed causing the actions including generating a unique code including at least one data item to be shared with a receiver device, where the unique code is encoded with at least one parameter associated with the sender device. Further, the computer executable program code when executed causing the actions including sharing the unique code with the receiver device to automatically trigger the data share event.

Accordingly the embodiments herein provide a computer program product comprising computer executable program code recorded on a computer readable non-transitory storage medium, the computer executable program code when executed causing the actions including recognizing at least one data item encoded in a unique code, wherein the at least one data item is stored at a sender device. Further, the computer executable program code when executed causing the actions including automatically triggering the data share event to receive the at least one data item from the sender device.

Accordingly the embodiments herein provide a method for sharing data of a first device. The method includes generating a unique code comprising at least one data item corresponding to the data to be shared with a second device, where the unique code is encoded with at least one parameter associated with the first device. Further, the method includes displaying the unique code to be shared with the second device to trigger a data share event to transmit the data to the second device.

Accordingly the embodiments herein provide a first device for sharing data with a second device. The first device includes a code unit configured to generate a unique code comprising at least one data item corresponding to the data to be shared with the second device, where the unique code is encoded with at least one parameter associated with the first device. Further, the first device includes a controller unit configured to display the unique code to be shared with the second device to trigger a data share event to transmit the data to the second device.

Accordingly the embodiments herein provide a second device for triggering a data share event with a first device. The second device includes a controller unit configured to scan a unique code from the first device, and a code unit configured to identify at least one data item encoded in the unique code, where the at least one data item corresponds to data stored at the first device. Further, the controller unit is configured to trigger the data share event to receive the data corresponding to the at least one data item from the first device, in response to the identifying of the at least one data item.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
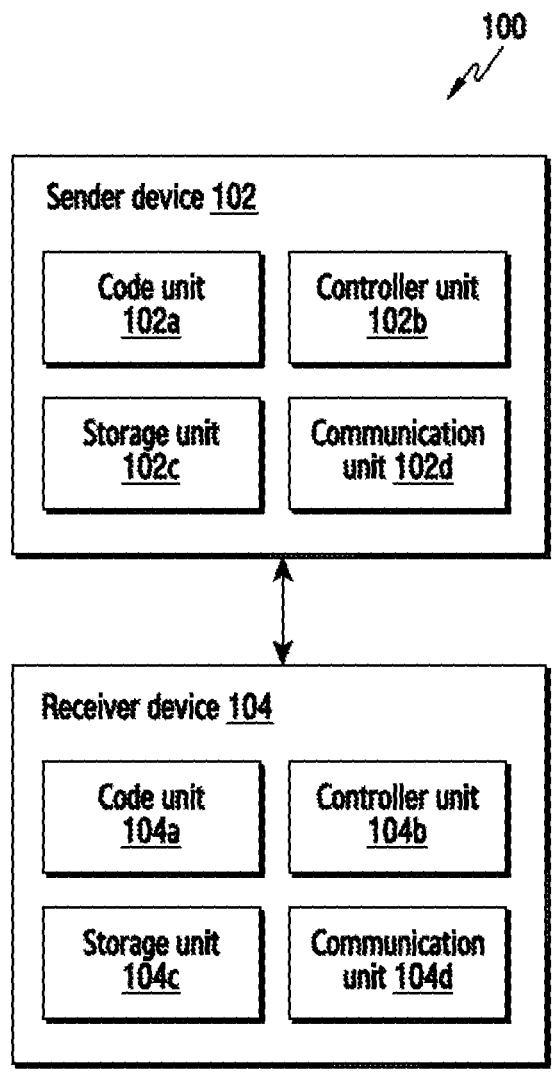
FIG. 1 illustrates a system for automatically triggering a data share event between a sender device and a receiver device, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Throughout the description, in an embodiment, "User" of the sender device and "User" of the receiver device are same. In another embodiment, the "User" of the sender device and "User" of the receiver device are different.

The embodiments herein disclose a method for automatically triggering a data share event between a sender device and a receiver device. The method includes generating a unique code including at least one data item to be shared with the receiver device, where the unique code is encoded with at least one parameter associated with the sender device. Further, the method includes sharing the unique code with the receiver device to automatically trigger the data share event.

In an embodiment, the parameter is a unique security key, an address of the sender device, and capability information of the sender device.

Another embodiment herein discloses a method for automatically triggering the data share event between the sender device and the receiver device. The method includes recognizing the at least one data item encoded in the unique code, where the at least one data item is stored at the sender device. Further, the method includes automatically triggering the data share event to receive the at least one data item from the sender device.

In an embodiment, the at least one data item encoded in the unique code is recognized by decoding the unique code based on at least one parameter associated with the sender device, where the parameter is a unique security key.

In an embodiment, automatically triggering the data share event to receive the at least one data item from the sender device includes displaying the at least one data item. Further, the method includes generating the unique code including at least one data item selected from the at least one displayed data item. Further, the method includes sharing the unique code with the sender device to automatically trigger the data share event to receive the at least one data item from the sender device.

In an embodiment, the unique code is encoded with at least one parameter associated with the receiver device, where the at least one parameter is a unique security key, an address of the receiver device, and capability information of the receiver device. In an embodiment, camera is a basic functionality of the sender device or the receiver device and can be used for scanning the unique code to transfer the data items. Similarly, speaker and a microphone can also be used in sound wave detection for transferring the data items. Initially, the sender device generates a sound wave at a certain frequency. Further, the receiver device needs to receive the sound wave using the microphone feature of the receiver device. If the information encoded in the sound wave matches at the receiver device, the connection between the sender device and the receiver device is triggered and the data items are transferred.

The conventional systems and methods provide only basic functionalities where an encoded address will be dictated by the communication application that is established, for example, can be a Bluetooth address, an Internet Protocol (IP) address, a Uniform Resource Locator (URL), or the like.

Unlike the conventional systems and methods, the proposed method provides a robust and simple mechanism for automatically triggering the data share event between the sender device and the receiver device. Further, the proposed method provides the user one or more options to select a type of backup data. Further, the unique code is generated by encoding the selected data type into the unique code, which will be used for transmitting content of the selected data type; thus, transferring the backup data seamlessly.

Further, the user can select a mode of communication from the options provided based on the hardware ability. The mode of communication can be Bluetooth, Wireless Fidelity (Wi-fi), Near Field Communication (NFC), or the like. The user needs to select the mode of communication to transfer the backup data. In the proposed method, the backup data will be transferred (shared) based on receiving electronic device custom request in the form of the unique code thus, preventing the user to perform number of file selection steps and transferring.

Referring now to the drawings, and more particularly to FIGS. 1 through 12, where similar reference characters denote corresponding features consistently throughout the figures, there are shown preferred embodiments.

FIG. 1 illustrates a system 100 for automatically triggering a data share event between a sender device and a receiver device, according to an embodiment as disclosed herein. In an embodiment, the system 100 includes the sender device 102 and the receiver device 104. The sender device 102 and the receiver device 104 can be, for example, a laptop, a desktop computer, a mobile phone, a smart phone, Personal Digital Assistants (PDAs), a tablet, a phablet, or the like.

In an embodiment, the sender device 102 includes a code unit 102a, a controller unit 102b, a storage unit 102c, and a communication unit 102d. The code unit 102a can be configured to generate a unique code (i.e., sender's unique code) including at least one data item to be shared with the receiver device 104. The unique code can be, for example, a Bar code, a Quick Response (QR) code, or the like. In an embodiment, the data item is an application data such as Contacts data, Messages data, Images data, Music data, Videos data, documents data, call logs data, or the like. Further, the unique code is encoded with at least one parameter associated with the sender device 102. In an embodiment, the parameter is a unique security key, an address (for example, Media Access Control (MAC) address) of the sender device 102, and capability information of the sender device 102. In an example, the capability information can be a Camera, Bluetooth, a Wireless Fidelity (Wi-Fi), a Near Field Communication (NFC), or the like. The unique security key is generated as described in conjunction with the FIG. 3.

The controller unit 102b can be configured to share the unique code with the receiver device 104 to automatically trigger the data share event. In an embodiment, the code unit 102a can be part of the controller unit 102b for generating the unique code. In another embodiment, the functionalities of the code unit 102a can also be performed by the controller unit 102b. In an embodiment, the controller unit 102b can, optionally, include a communication mode selector unit, an input unit, a user selection unit, and a data selector unit.

The communication mode selector unit can enable the user to select a communication mode (i.e., capability information) for transferring the data items. Based on hardware and software capability of the sender device 102, the user is provided with a list of available communication modes. The user can select the communication mode based on his/her interest from the displayed list. Further, the input unit can receive an input (i.e., touch input from the user) for selecting the data items that need to be transferred to the receiver device 104.

Further, the user selection unit can enable the user to select the options related to the communication mode, the data items, or the like displayed on the sender device 102. Further, the data selector unit can covey the information to the controller unit 102b regarding the user's data selection. Further, the functionalities performed by the communication mode selector unit, the input unit, the user selection unit, and the data selector unit can be performed by the controller unit 102b.

In an embodiment, the unique code is an encrypted code having embedded information such as strings, numbers, texts, Uniform Resource Locators (URLs), or the like. Further, the unique code can include the address of the sender device 102 as well as the data items (i.e., information about the backup data) to be transferred to the receiver device 104. Unlike the conventional systems and methods, the usage of the unique code for transferring the data items from the sender device 102 to the receiver device 104 is safe and secure as the encrypted information inside the unique code cannot be modified after generating the unique code. Further, the receiver device 104 can decrypt the information available inside the unique code thus; it is a reliable form of the data encryption and decryption.

The storage unit 102c stores the data items corresponding to the user which will be later transferred to the receiver device 104. Further, the storage unit 102c may include one or more computer-readable storage media. The storage unit 102c may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 102c may, in some examples, be considered a non-transitory storage medium. The term "non-transitory" may indicate that the storage medium is not embodied in a carrier wave or a propagated signal. However, the term "non-transitory" should not be interpreted that the storage unit 102c is non-movable. In some examples, the storage unit 102c can be configured to store larger amounts of information than the memory. In certain examples, a non-transitory storage medium may store data that can, over time, change (e.g., in Random Access Memory (RAM) or cache). The communication unit 102d can be configured for communicating internally between the units and externally with the receiver device 104. Further, the communication unit 102d can be configured to transfer the data items to the receiver device 104.

In an embodiment, the receiver device 104 includes a code unit 104a, a controller unit 104b, a storage unit 104c, and a communication unit 104d. The code unit 104a can be configured to recognize the at least one data item encoded in the unique code, where the at least one data item is stored at the sender device 102. The at least one data item encoded in the unique code is recognized by decoding the unique code based on the at least one parameter associated with the sender device 102, where the parameter is the unique security key. Further, the controller unit 104b can be configured to automatically trigger the data share event to receive the at least one data item from the sender device 102.

In an embodiment, after recognizing the at least one data item encoded in the unique code, the controller unit 104b can be configured to display the at least one data item. Further, the controller unit 104b can be configured to generate a unique code (i.e., receiver's unique code) including at least one data item selected from the at least one displayed data item. Further, the controller unit 104b can be configured to share the unique code with the sender device 102 to automatically trigger the data share event to receive the at least one data item (i.e., the data items selected by the user from the displayed data items) from the sender device 102. In an embodiment, the unique code is encoded with at least one parameter associated with the receiver device 104, where the at least one parameter is a unique security key, an address of the receiver device 104, and capability information of the receiver device 104.

In an embodiment, the controller unit 104b can optionally include a scanner unit, a detection unit, and an execution unit. The scanner unit can scan the unique code displayed on the sender device 102 and decrypt the information embedded inside the unique code. The scanner unit uses the camera feature of the receiver device 104 to scan the unique code displayed on the sender device 102. In an example, the scanner unit scans the unique code and fetches the details about the alignment, version information, an Identifier, separators, format information, and contents. Based on the above information fetched from the unique code, the scanner unit decrypts the information available in the unique code. The decrypted information will be displayed to the user on the receiver device 104.

Further, the detection unit can decode the scanned unique code and extracts the information hidden in the unique code. Further, the detection unit displays the data items which are going to be transferred based on the unique code. If there are no data items available in the unique code then, it will directly transform the request to the execution unit. In an embodiment, the execution unit can display the unique code in the form of a custom request. In another embodiment, the execution unit can transfer the data items directly. Based on the information received from the detection unit, the execution unit can generate the unique code again or trigger the data transfer.

The storage unit 104c may include one or more computer-readable storage media. The storage unit 104c may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 104c may, in some examples, be considered a non-transitory storage medium. The term "non-transitory" may indicate that the storage medium is not embodied in a carrier wave or a propagated signal. However, the term "non-transitory" should not be interpreted that the storage unit 104c is non-movable. In some examples, the storage unit 104c can be configured to store larger amounts of information than the memory. In certain examples, a non-transitory storage medium may store data that can, over time, change (e.g., in Random Access Memory (RAM) or cache). The communication unit 104d can be configured for communicating internally between the units and externally with the sender device 102. Further, the communication unit 104d can be configured to receive the data items from the sender device 102.

In an embodiment, once the user has selected the communication mode and the custom request has been received, the sender device 102 initiates transferring the data items. The data items are transferred in terms of packets relevant to the selected communication mode. For example, the contacts will be transferred as a VCF file and other data items accordingly. After receiving the data items, the controller unit 104b can restore the received data items in directories and locations. For example, the contacts data (i.e., data item) is restored in phonebook memory. Further, the images data, videos data and other files data are restored to their respective locations in the receiver device 104.

Unlike the conventional systems and methods, the unique code is generated for a particular purpose. The unique code can embed any kind of information, such as text, numbers, and strings and so on. It is fully secure as, nobody can modify the embedded information inside the unique code. Further, nowadays Camera is a common feature in all types of electronic devices and they have ability to scan the unique code. It will be very useful feature for users as the number of steps will be very less. The user just needs to scan the unique code using the camera and select the data items to be transferred.

The FIG. 1 shows the system 100 but it is to be understood that other embodiments are not limited thereon. In other embodiments, the system 100 may include less or more number of electronic devices. Further, the labels or names of the units in the electronic devices are used only for illustrative purpose and does not limit the scope of the invention. One or more units can be combined together to perform same or substantially similar function in the system 100.

Figure 2:
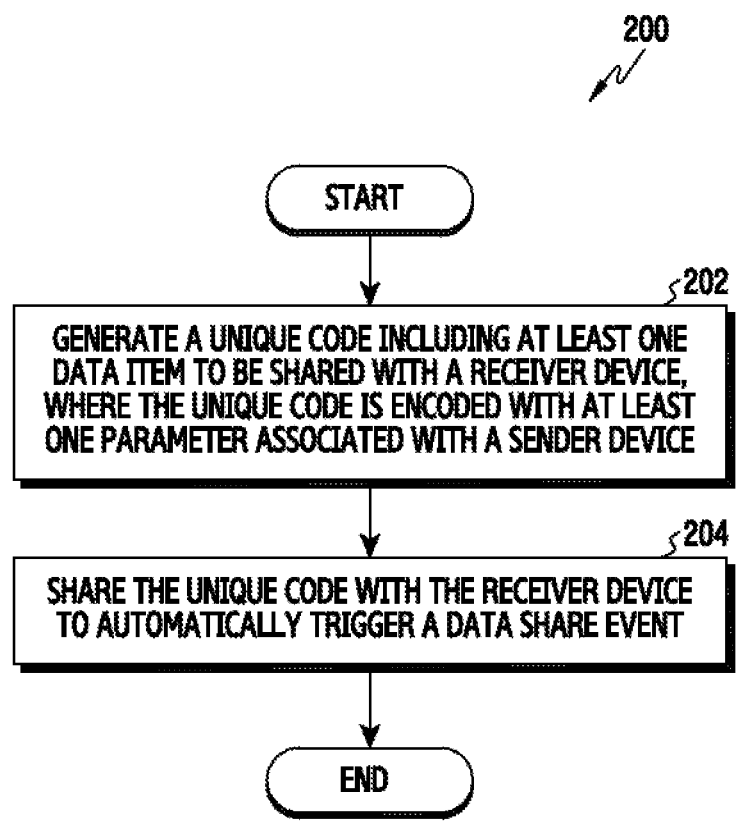
FIG. 2 is a flow diagram illustrating a method for automatically triggering a data share event by a sender device for sharing a unique code with a receiver device, according to an embodiment as disclosed herein.

FIG. 2 is a flow diagram illustrating a method 200 for automatically triggering the data share event by the sender device 102 for sharing the unique code with the receiver device 104, according to an embodiment as disclosed herein.

At step 202, the method 200 includes generating the unique code including the at least one data item to be shared with the receiver device 104. The method 200 allows the code unit 102a to generate the unique code including the at least one data item to be shared with the receiver device 104. The unique code is encoded with the at least one parameter associated with the sender device 102. The unique code can be, for example, the Bar code, the QR code, or the like. In an embodiment, the data item is the application data such as the Contacts data, the Messages data, the Images data, the Music data, the Videos data, the documents data; the call logs data, or the like. In an embodiment, the parameter is the unique security key, the address (for example, MAC address) of the sender device 102, and the capability information of the sender device 102. In an example, the capability information can be the Bluetooth, the Wi-Fi, the NFC, or the like. The mechanism for generating the unique security key is described in conjunction with the FIG. 3.

At step 204, the method 200 includes sharing the unique code with the receiver device 104 to automatically trigger the data share event. The method 200 allows the controller unit 102b to share the unique code with the receiver device 104 to automatically trigger the data share event.

Unlike the conventional system and methods, through the proposed mechanism, the user can transfer the selective data items by generating the unique code. The unique code is generated based on the data items such as the phonebook data, the images data, the videos data, or any other files data. Initially, the user need to select the data items for backup then, the capability information such as the address of the sender device 102, the camera functionality of the sender device 102, and the communication modes available in the sender device 102 will be encoded in the unique code.

At the receiver device 104, the user will scan the unique code and displays the data items. Once the user at the receiver device 104 agrees to the data items, the receiver device 104 generates and displays the unique code (i.e., receiver's unique code). The user need to scan the unique code displayed on the receiver device 104 using the camera of the sender device 102. After successful scanning of the unique code, the data items are transferred. Further, the proposed mechanism does not require any authentication process. The user at the sender device 102 is provided with the option to select the data items which need backup and the user at the receiver device 102 to accept the data items. The communication will trigger between the sender device 102 and the receiver device 104 based on the successful scanning of the unique code.

The various actions, acts, blocks, steps, or the like in the method 200 may be performed in the order presented, in a different order or simultaneously. Further, in some embodiments, some of the actions, acts, blocks, steps, or the like may be omitted, added, modified, skipped, or the like without departing from the scope of the invention.

Figure 3:
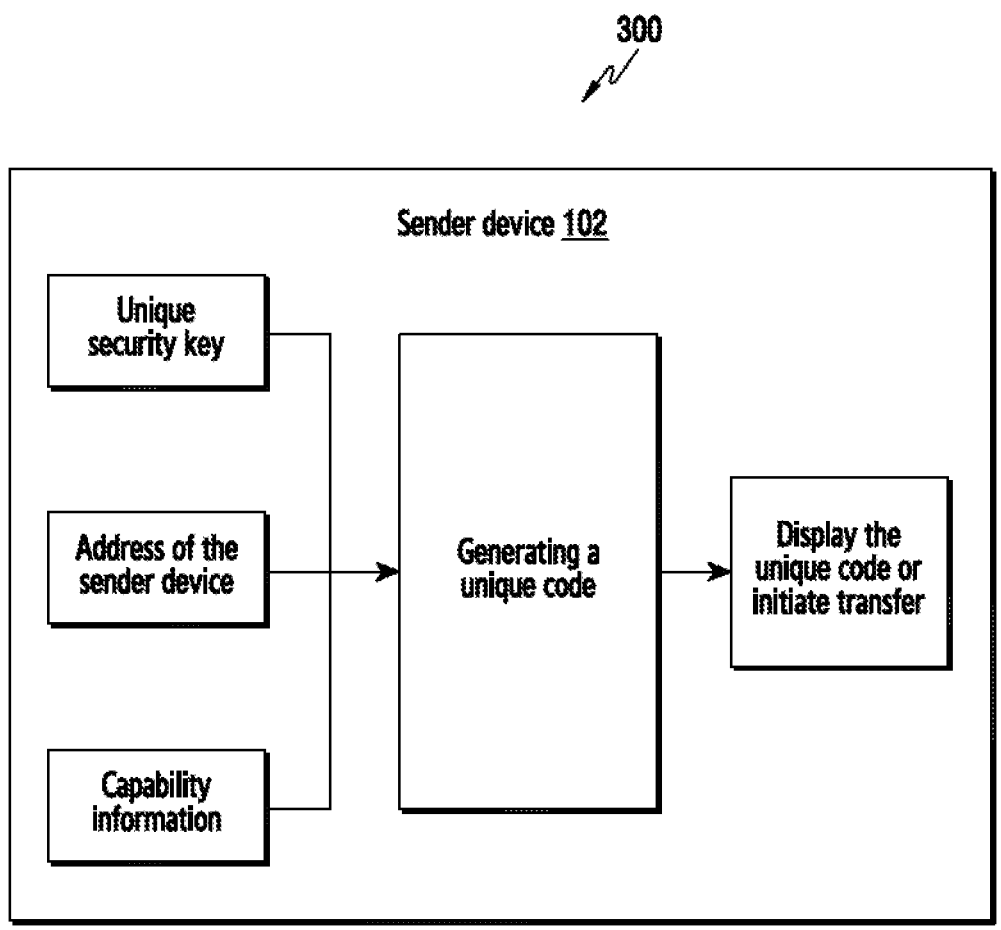
FIG. 3 illustrates a block diagram for generating a unique code at a sender device, according to an embodiment as disclosed herein.

FIG. 3 illustrates a block diagram for generating the unique code at the sender device 102, according to an embodiment as disclosed herein. The unique code can be generated by the sender device 102 in a unique way as shown in the FIG. 3. The unique code is generated by embedding the unique security key, the address of the sender device 102, and the capability information of the sender device 102 as shown in the FIG. 3. After generating the unique code, the generated unique code can be displayed on the sender device 102 or data transfer can be initiated. The type of input for generating the unique code in case of Original equipment manufacturer (OEM) device will be different than the type of input for generating the unique code in case of a Non-OEM device. Further, the unique code can be encoded with the unique security key. Further, the mechanism for generating the unique security key in case of the OEM device and the Non-OEM device is explained below:

OEM device: In an embodiment, if the sender device 102 is the OEM device then, the unique security key can be a combination of a mobile number, an E-mail ID, and an OEM version number. In another embodiment, the unique security key can be any unique ID associated with the user such as a PIN, a password, the mobile number, the E-mail ID, or the like. If there is any error while creating the unique security key then, the unique security key such as the PIN or the password can be used to encode the unique code. Further, an option can be provided inside the Settings of the sender device 102. The user at the receiver device 104 is prompted to enter the PIN or the password.

Non-OEM device: If the sender device 102 is the Non-OEM device then, the unique security key can be replaced by "NULL". In another embodiment, the unique security key can be the unique id associated with the user such the PIN, the password, the mobile number, the E-mail id, or the like. Further, the option can be provided inside the Settings of the sender device 102. The user at the receiver device 104 is prompted to enter the PIN or the password.

Figure 4A:
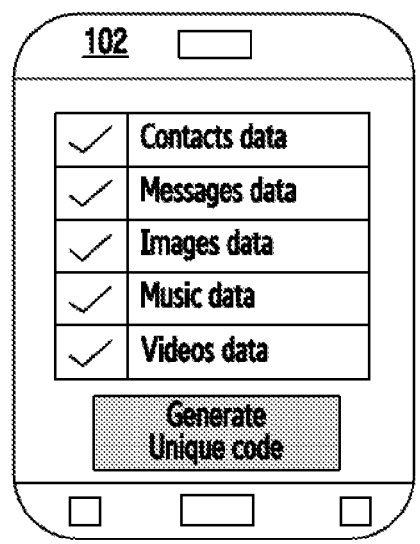
FIGS. 4A to 4C illustrate an example scenario in which a unique code is generated at a sender device, according to an embodiment as disclosed herein.
Figure 4B:
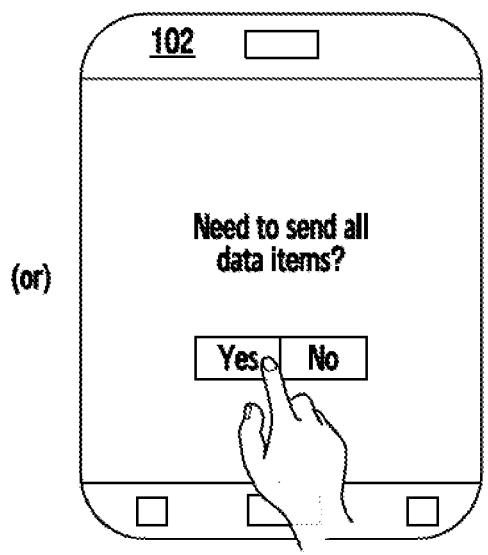
Figure 4C:
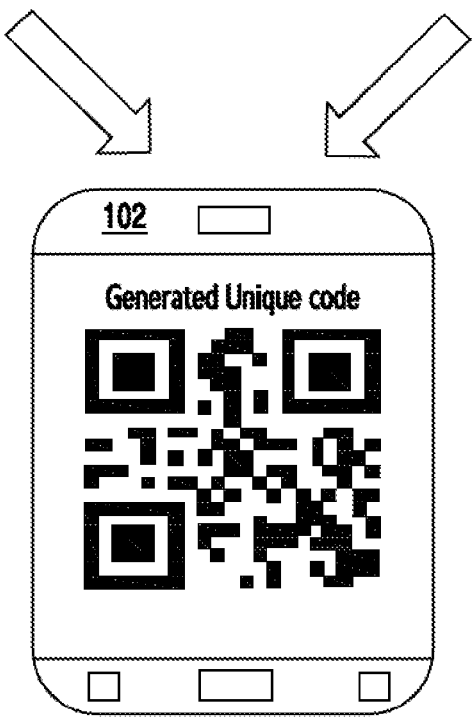

FIGS. 4A to 4C illustrate an example scenario in which the unique code is generated at the sender device 102, according to an embodiment as disclosed herein. Consider a scenario where the user is migrating from one device (i.e., sender device 102) to another device (i.e., receiver device 104). In an embodiment, the user selects the data items such as the contacts data, the messages data, the images data, the Music data, and the Videos data which are of user's interest for transferring to the receiver device 104 as shown in the FIG. 4A. By considering the selected data items, the code unit 102a can be configured to generate the unique code including the data items to be shared (or transferred) with (or to) the receiver device 104.

Further, the unique code is encoded with the MAC address of the sender device 102 and the capability information of the sender device 102. The generated unique code is displayed on the sender device 102 as shown in the FIG. 4C. Further, the user of the receiver device 104 need to scan the unique code and extract the address of the sender device 102, the capability information of the sender device 102, and the data items.

In another embodiment, the user is provided with an option whether the user need to transfer all the data items or a specific data items stored in the sender device 102 to the receiver device 104 as shown in the FIG. 4B. Further, the user accepts to send all the data items the contacts data, the messages data, the images data, the music data, the videos data, the documents data; and the call logs data stored in the sender device 102 to the receiver device 104. Further, by considering all the data items, the code unit 102a can be configured to generate the unique code and the unique code is displayed on the sender device 102 as shown in the FIG. 4C.

Figure 5:
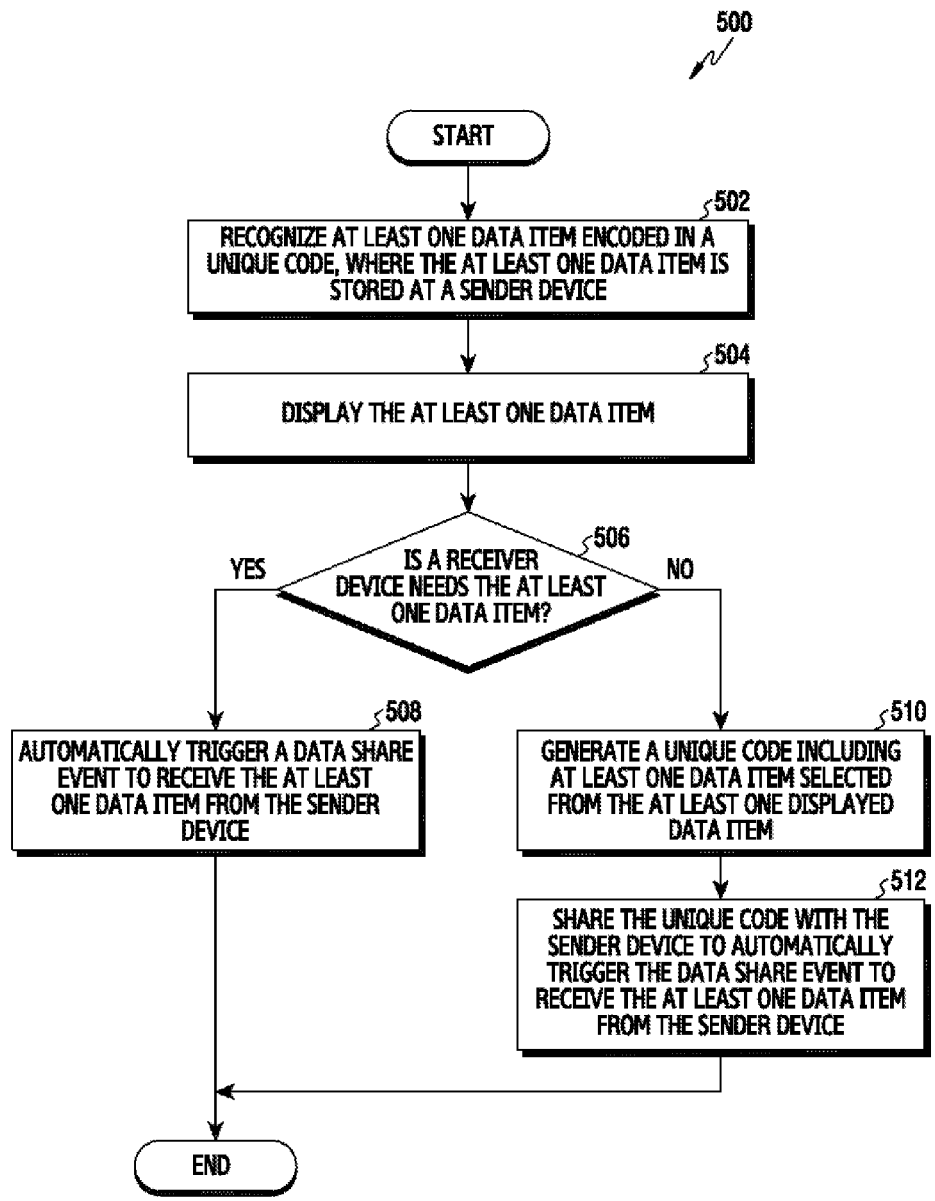
FIG. 5 is a flow diagram illustrating a method for automatically triggering a data share event by a receiver device, according to an embodiment as disclosed herein.

FIG. 5 is a flow diagram illustrating a method 500 for automatically triggering the data share event by the receiver device 104, according to an embodiment as disclosed herein. At step 502, the method 500 includes recognizing the at least one data item encoded in the unique code. The method 500 allows the code unit 104a to recognize the at least one data item encoded in the unique code. The at least one data item is stored at the sender device 102. In an embodiment, initially the receiver device 104 scans the unique code displayed on the sender device 102 using the camera feature of the receiver device 104. After scanning the unique code, the receiver device 102 extracts the data items, the address of the sender device 102, the capability information of the sender device 102 from the unique code.

At step 504, the method 500 includes displaying the at least one data item. The method 500 allows the controller unit 104b to display the at least one data item. If it is determined, at step 506, that the receiver device 104 needs all the at least one data item then, at step 508, the method 500 includes automatically triggering the data share event to receive the at least one data item from the sender device 102. The method 500 allows the controller unit 104b to automatically trigger the data share event to receive the at least one data item from the sender device 102.

If it is determined, at step 506, that the receiver device 104 do not need all the at least one data item then, at step 510, the method 500 includes generating the unique code including the at least one data item selected from the at least one displayed data item. The method 500 allows the controller unit 104b to generate the unique code including the at least one data item selected from the at least one displayed data item. At step 512, the method 500 includes sharing the unique code with the sender device 102 to automatically trigger the data share event to receive the at least one data item from the sender device 102. The method 500 allows the controller unit 104b to share the unique code with the sender device 102 to automatically trigger the data share event to receive the at least one data item from the sender device 102.

The various actions, acts, blocks, steps, or the like in the method 500 may be performed in the order presented, in a different order or simultaneously. Further, in some embodiments, some of the actions, acts, blocks, steps, or the like may be omitted, added, modified, skipped, or the like without departing from the scope of the invention.

FIGS. 6A to 6F illustrate an example scenario in which the unique code comprising the at least one data item selected from the at least one displayed data item is generated at the receiver device 104 for receiving the at least data item, according to an embodiment as disclosed herein. Consider a scenario where the user is migrating from one device (i.e., sender device 102) to another device (i.e., receiver device 104). The user selects the data items such as the contacts data, the messages data, the images data, the Music data, and the Videos data which are of user's interest for transferring to the receiver device 104. By considering the selected data items, the unique code including the data items to be shared (or transferred) with (or to) the receiver device 104 is generated.

Figure 6A:
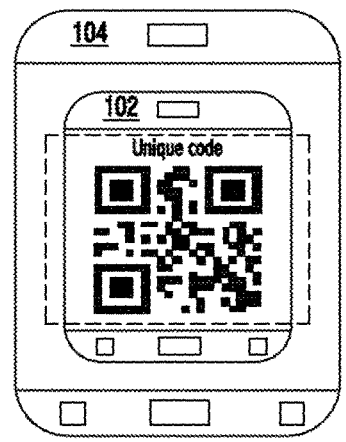
FIGS. 6A to 6F illustrate an example scenario in which a unique code comprising at least one data item selected from at least one displayed data item is generated at a receiver device for receiving the at least data item, according to an embodiment as disclosed herein.
Figure 6B:
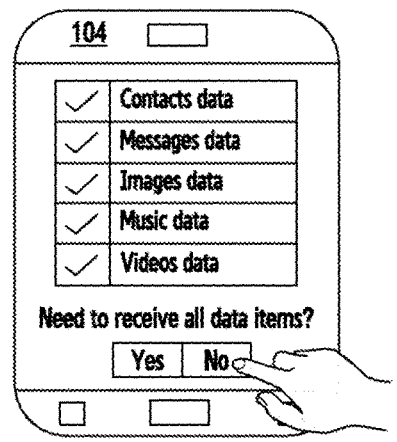
Figure 6D:
Figure 6C:
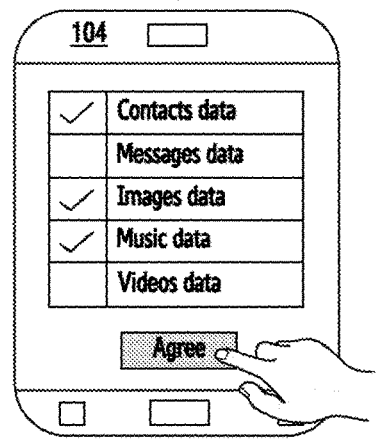

The receiver device 104 scans the unique code displayed on the sender device 102 as shown in the FIG. 6A. After scanning the unique code, the receiver device 104 extracts the encoded information such as the data items, the address of the sender device 102, and the capability information of the sender device 102. The extracted data items from the unique code are displayed on the receiver device 102 as shown in the FIG. 6B. Simultaneously, the user is displayed with the option "Need to receive all the data items" on the receiver device 104. The user rejects to receive all the data items displayed on the receiver device as shown in the FIG. 6B.

Further, the user of the receiver device 104 is provided with the option to select or deselect the data items displayed on the receiver device 104. As shown in the FIG. 6C, the user selects the data items such as the contacts data, the images data, and the music data to be received from the sender device 102. Once the user selects the "Agree" option on the receiver device 104, the code unit 104a can be configured to generate the unique code comprising the selected data items (i.e., the contacts data, the images data, and the music data). The generated unique code is displayed on the receiver device 104 as shown in the FIG. 6D and has the information about the data items which the user of the receiver device 104 has confirmed.

Figure 6E:
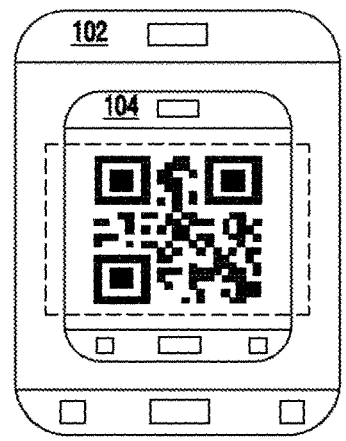
Figure 6F:
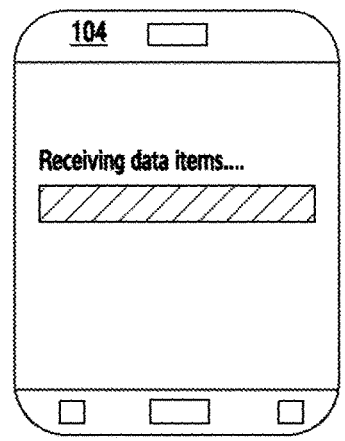

Further, the sender device 102 scans the unique code displayed on the receiver device 104 as shown in the FIG. 6E. After scanning the unique code, the sender device 102 detects the custom request indicating the data items to be transferred and the preferred communication mode by which the data items are transferred to the receiver device 104. Further, the sender device 102 triggers the data share event to transfer the data items to the receiver device 104 as shown in the FIG. 6F. Only the data items which are indicated in the custom request are transferred in the form of the unique code.

FIGS. 7A to 7D illustrate another example scenario in which the sender device 102 not having a camera is configured to send the at least one data item without selection to the receiver device 104, according to an embodiment as disclosed herein. Consider a scenario where the user is migrating from one device (i.e., sender device 102) to another device (i.e., receiver device 104). The user selects the data items such as the contacts data, the messages data, the images data, the Music data, and the Videos data which are of user's interest for transferring to the receiver device 104. By considering the selected data items, the unique code including the data items to be shared (or transferred) with (or to) the receiver device 104 is generated. The generated unique code is displayed on the sender device 102 as shown in the FIG. 7A.

Figure 7A:
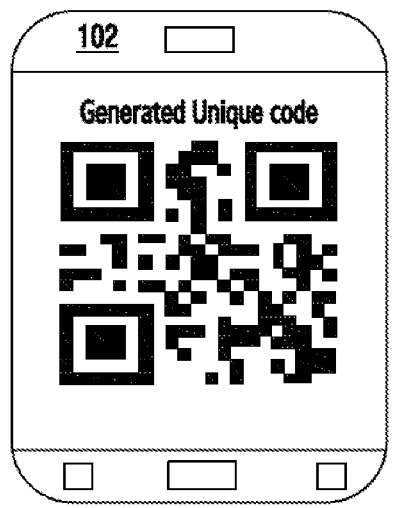
FIGS. 7A to 7D illustrate another example scenario in which a sender device not having a camera is configured to send at least one data item without selection to a receiver device, according to an embodiment as disclosed herein.
Figure 7B:
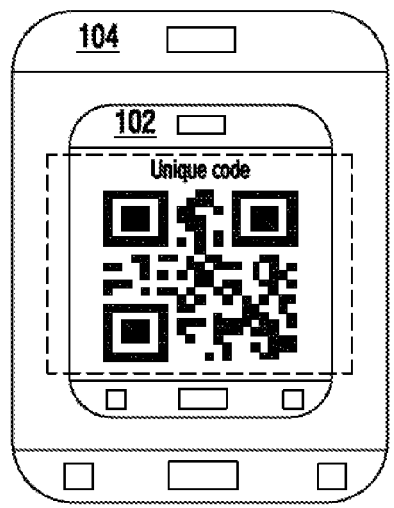
Figure 7C:
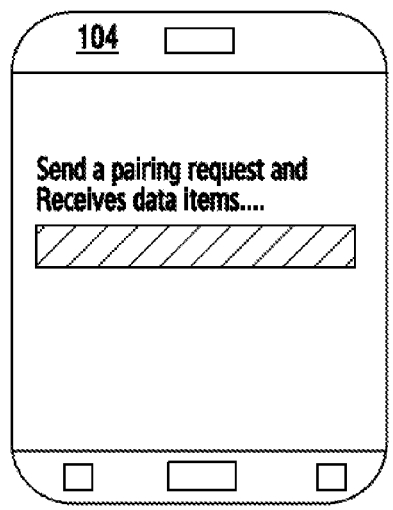
Figure 7D:
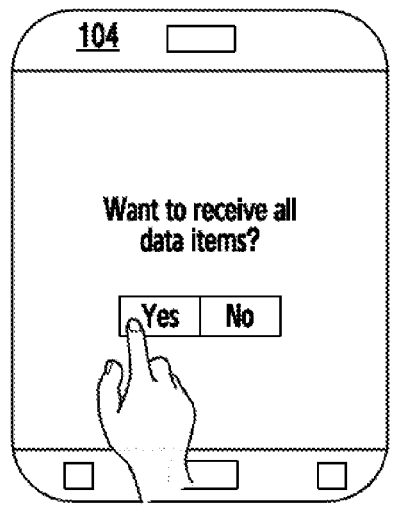

The receiver device 104 scans the unique code displayed on the sender device 102 as shown in the FIG. 7B. After scanning the unique code, the receiver device 104 extracts the encoded information such as the data items, the address of the sender device 102, and the capability information of the sender device 102. The extracted data items from the unique code are displayed on the receiver device 102 as shown in the FIG. 7C. Simultaneously, the user is displayed with the option "Need to receive all the data items" on the receiver device 104. The user accepts to receive all the data items displayed on the receiver device 104 as shown in the FIG. 7C.

Further, the receiver device 104 sends a pairing request to the address decoded from the unique code. The sender device 102 accepts the connection request and triggers the data share event to transfer the data items to the receiver device 104. Further, the receiver device 104 receives the data items from the sender device 102 as shown in the FIG. 7D.

Figure 8:
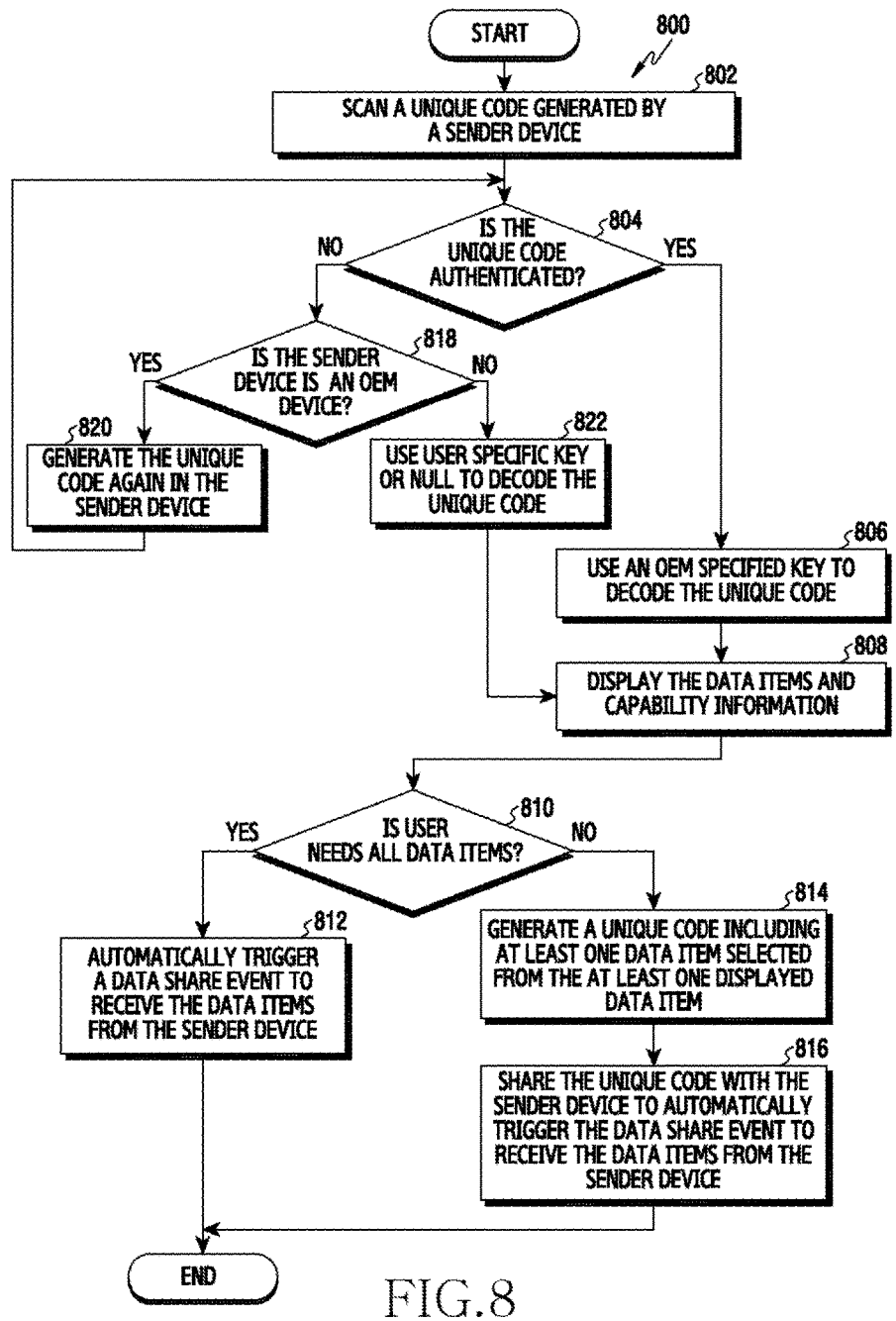
FIG. 8 is a flow diagram illustrating a method for automatically triggering a data share event after detecting whether a sender device is an Original Equipment Manufacturer (OEM) device, according to an embodiment as disclosed herein.
Figure 9A:
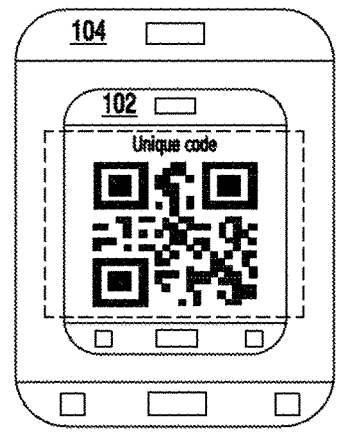
FIGS. 9A to 9D illustrate an example scenario in which a sender device without a camera is a Non-OEM device and a receiver device is an OEM device configured to automatically trigger a data share event, according to an embodiment as disclosed herein.
Figure 9B:
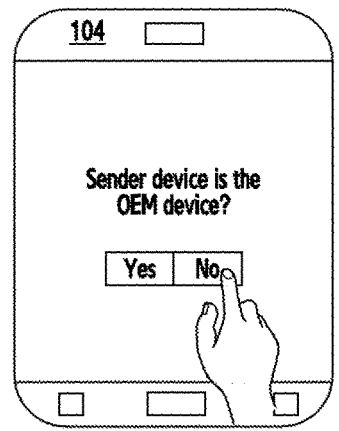
Figure 9D:
Figure 9C:
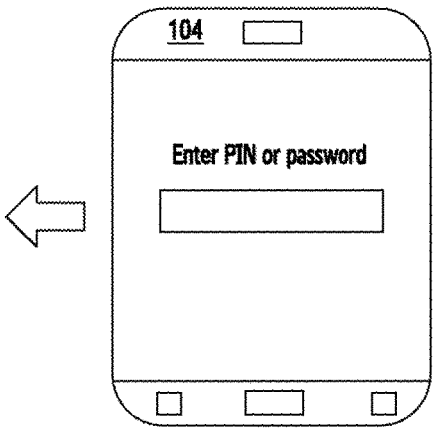

FIG. 8 is a flow diagram illustrating a method 800 for automatically triggering the data share event after detecting whether the sender device 102 is an Original Equipment Manufacturer (OEM) device, according to an embodiment as disclosed herein. At step 802, the method 800 includes scanning the unique code generated by the sender device 102. The method 800 allows the receiver device 104 to scan the unique code generated by the sender device 102.

If it is determined, at step 804, that the unique code is authenticated then, at step 806, the method 800 includes using the OEM specified key to decode the unique code generated by the sender device 102. The method 800 allows the receiver device 104 to use the OEM specified key to decode the unique code generated by the sender device 102. At step 808, the method 800 includes displaying the data items and the capability information of the sender device 102. The method 800 allows the receiver device 104 to display the data items and the capability information of the sender device 102.

If it is determined, at step 810, that the user of the receiver device 104 needs all the data items then, at step 812, the method 800 includes automatically triggering the data share event to receive the data items from the sender device 102. The method 800 allows the receiver device 104 to automatically trigger the data share event to receive the data items from the sender device 102. If it is determined, at step 810, that the user of the receiver device 104 do not need all the data items then, at step 814, the method 800 includes generating the unique code including the at least one data item selected from the at least one displayed data item. The method 800 allows the receiver device 104 to generate the unique code including the at least one data item selected from the at least one displayed data item. At step 816, the method 800 includes sharing the unique code with the sender device 102 to automatically trigger the data share event to receive the data items from the sender device 102. The method 800 allows the receiver device 104 to share the unique code with the sender device 102 to automatically trigger the data share event to receive the data items from the sender device 102.

If it is determined, at step 804, that the unique code is not authenticated then, at step 818, the method 800 includes determining the sender device 102 is the OEM device. If it is determined, at step 818, that the sender device 102 is the OEM device then, at step 820, the method 800 includes generating the unique code by the sender device 102 and looped back to step 804 as described above. If it is determined, at step 818, that the sender device 102 is not the OEM device then, at step 822, the method 800 includes using the specific key or NULL to decode the unique code and looped back to step 808 as described above.

The various actions, acts, blocks, steps, or the like in the method 800 may be performed in the order presented, in a different order or simultaneously. Further, in some embodiments, some of the actions, acts, blocks, steps, or the like may be omitted, added, modified, skipped, or the like without departing from the scope of the invention.

FIGS. 9A to 9D illustrate an example scenario in which the sender device 102 without the camera is the Non-OEM device and the receiver device 102 is the OEM device configured to automatically trigger the data share event, according to an embodiment as disclosed herein. Consider a scenario, where the user is migrating from one device (i.e., sender device 102) to another device (i.e., receiver device 104). The receiver device 104 scans the unique code displayed on the sender device 102 as shown in the FIG. 9A.

After scanning the unique code, the receiver device 104 extracts the encoded information such as the data items, the address of the sender device 102, and the capability information of the sender device 102. The user is displayed with the option "Is sender device 102 is the OEM device" on the receiver device 104. If the sender device 102 is not the OEM device then, the user is prompted to enter the PIN or the password set by the user at the sender device 102. If the PIN or the password match is detected then, the receiver device 104 sends the pairing request to the sender device 102 for establishing the connection between the sender device 102 and the receiver device 104. Once the sender device 102 accepts the pairing request, the data share event is triggered for transferring the data items to the receiver device 104. Further, the receiver device 104 receives the data items from the sender device 102 as shown in the FIG. 9D. In an example, the sender device 102 does not have the camera and cannot able to scan the unique code generated by the receiver device 104. Due to which direct data share event is triggered after accepting the pairing request received from the receiver device 104.

FIGS. 10A to 10F illustrate another example scenario in which the sender device 102 with the camera is the Non-OEM device and the receiver device 104 is the OEM device configured to automatically trigger the data share event, according to an embodiment as disclosed herein. Consider a scenario where the user is migrating from one device (i.e., sender device 102) to another device (i.e., receiver device 104). The receiver device 104 scans the unique code displayed on the sender device 102 as shown in the FIG. 10A.

After scanning the unique code, the receiver device 104 extracts the encoded information such as the data items, the address of the sender device 102, and the capability information of the sender device 102. The user is displayed with the option "Is sender device 102 is the OEM device" on the receiver device 104 as shown in the FIG. 10B. If the sender device 102 is not the OEM device then, the user is prompted to enter the PIN or the password set by the user at the sender device 102 as shown in the FIG. 10C. If the PIN or the password match is detected then, the receiver device 104 sends the pairing request to the sender device 102 for establishing the connection between the sender device 102 and the receiver device 104. As the camera is available at the sender device 102, the receiver device 104 generated the unique code and displayed on the receiver device 104 as shown in the FIG. 10D.

Figure 10A:
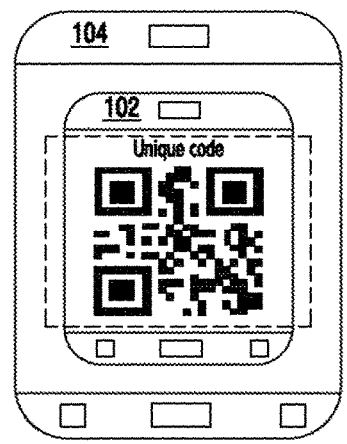
FIGS. 10A to 10F illustrate another example scenario in which a sender device with a camera is a Non-OEM device and a receiver device is an OEM device configured to automatically trigger a data share event, according to an embodiment as disclosed herein.
Figure 10B:
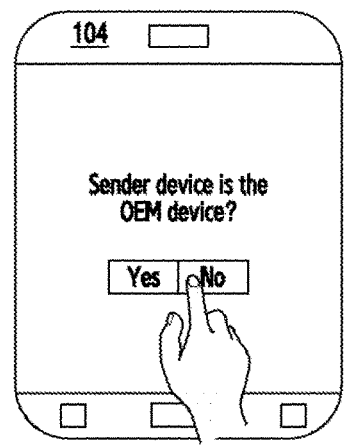
Figure 10D:
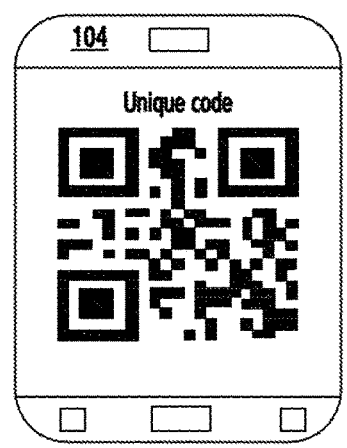
Figure 10C:
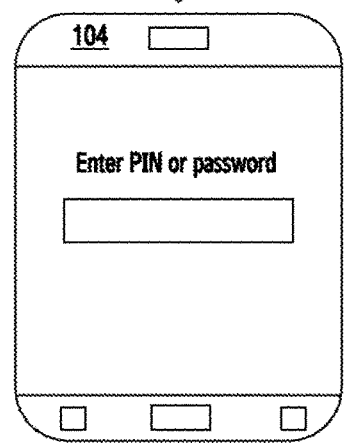
Figure 10E:
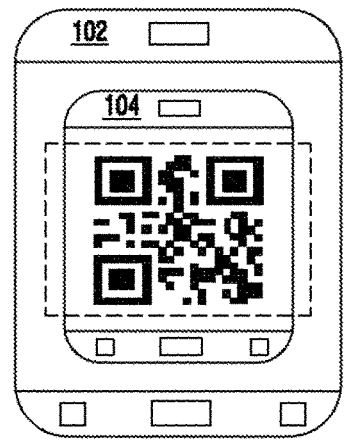
Figure 10F:
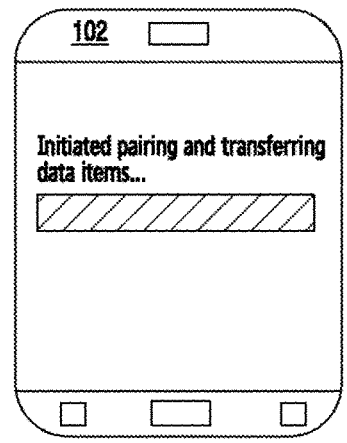

Further, the sender device 102 scans the unique code displayed on the receiver device 104 as shown in the FIG. 10E. After scanning the unique code, the sender device 102 detects the custom request indicating the data items to be transferred and the preferred communication mode by which the data items are transferred to the receiver device 104. Further, the sender device 102 triggers the data share event to transfer the data items to the receiver device 104 as shown in the FIG. 10F. Only the data items which are indicated in the custom request are transferred in the form of the unique code.

Figure 11A:
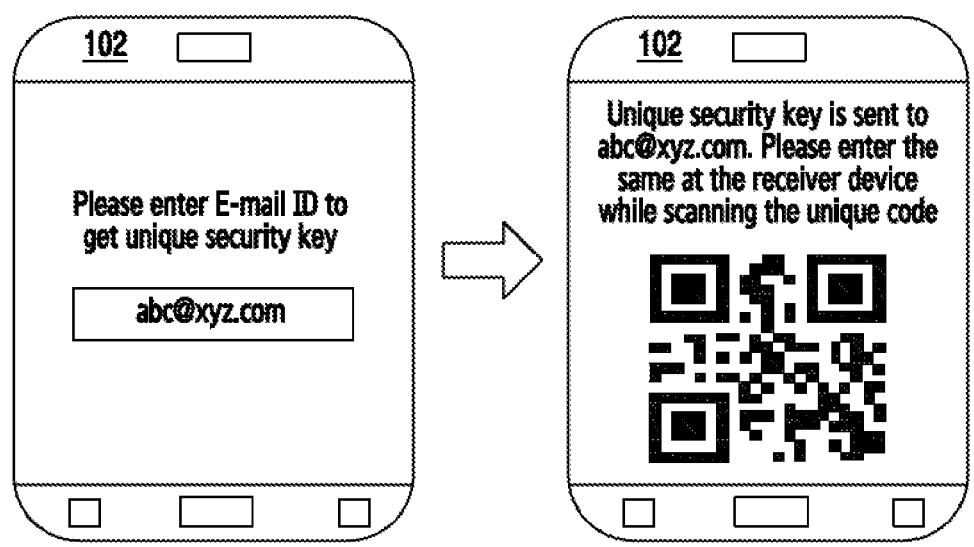
FIGS. 11A and 11B illustrate an example scenario in which a unique security key is authenticated through a server, according to an embodiment as disclosed herein.
Figure 11B:
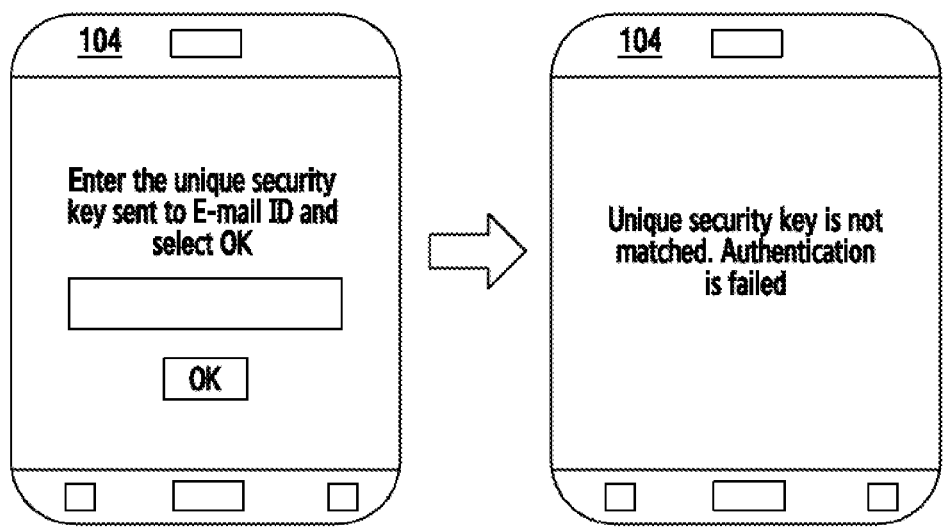

FIGS. 11A and 11B illustrate an example scenario in which the unique security key is authenticated through a server, according to an embodiment as disclosed herein. Consider a scenario where the sender device 102 is the Non-OEM device and the receiver device 104 is the Non-OEM device. Here, instead of the "NULL" value in place of the unique security key, the unique security key transfer happens using a server. Initially, the sender device 102 needs to be connected to the server through a network. The user of the sender device 102 need to provide their E-mail ID to get the unique security key as shown in the FIG. 11A. The unique security key will be sent to the E-mail ID and the same need to be entered at the receiver device 104 while scanning the unique code as shown in the FIG. 11A. In an example, the unique security key is valid up to 15 minutes.

Further, at the receiver device 104, the user need to enter the unique security key while scanning the unique code displayed on the sender device 102. If the entered unique security key is not matching with the encoded unique code then, authentication is failed as shown in the FIG. 11B.

Figure 12:
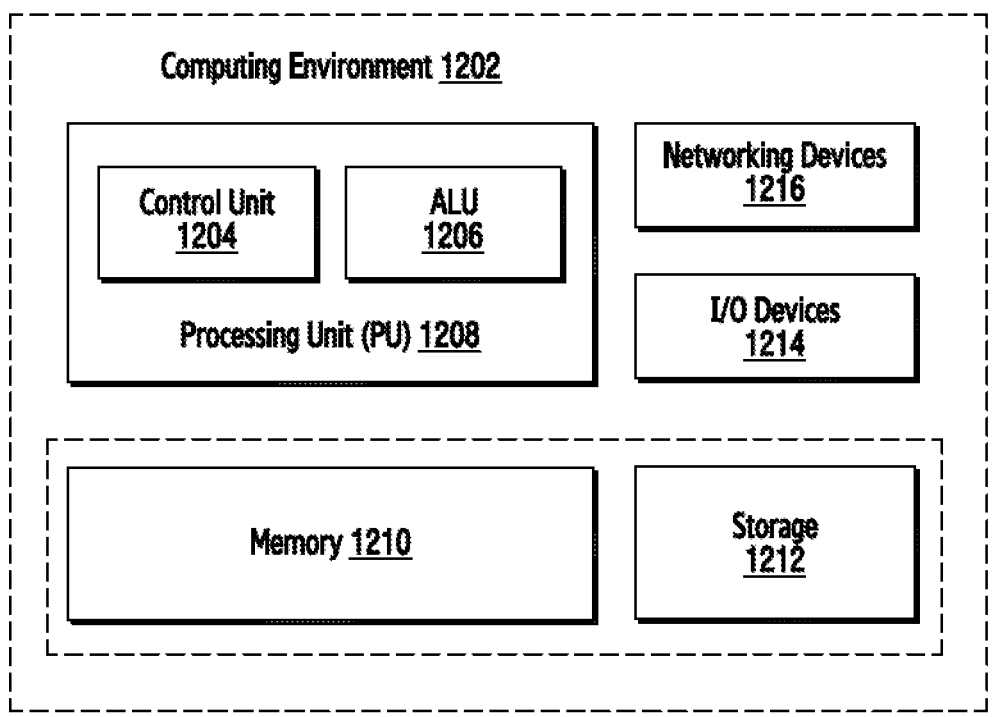
FIG. 12 illustrates a computing environment implementing the method and system for automatically triggering a data share event between a sender device and a receiver device, according to an embodiment as disclosed herein.

FIG. 12 illustrates a computing environment implementing the method and system for automatically triggering the data share event between the sender device 102 and the receiver device 104, according to an embodiment as disclosed herein. As depicted in the figure, the computing environment 1202 comprises at least one processing unit 1208 that is equipped with a control unit 1204 and an Arithmetic Logic Unit (ALU) 1206, a memory 1210, a storage unit 1212, plurality of networking devices 1216 and a plurality Input output (I/O) devices 1214. The processing unit 1208 is responsible for processing the instructions of the schemes. The processing unit 1208 receives commands from the control unit 1204 in order to perform its processing. Further, any logical and arithmetic operations involved in the execution of the instructions are computed with the help of the ALU 1206.

The overall computing environment 1202 can be composed of multiple homogeneous or heterogeneous cores, multiple CPUs of different kinds, special media and other accelerators. The processing unit 1208 is responsible for processing the instructions of the schemes. Further, the plurality of processing units 1208 may be located on a single chip or over multiple chips.

The scheme comprising of instructions and codes required for the implementation are stored in either the memory unit 1210 or the storage 1212 or both. At the time of execution, the instructions may be fetched from the corresponding memory 1210 or storage 1212, and executed by the processing unit 1208.

In case of any hardware implementations various networking devices 1216 or external I/O devices 1214 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 12 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for operating a first device, the method comprising:
   detecting at least one input for at least one data item among a plurality of data items, wherein the plurality of data items are stored in the first device;
   generating a first unique code for the at least one data item in response to detecting the at least one input;
   displaying the first unique code for scanning of a second device;
   scanning a second unique code displayed on the second device, wherein the second unique code includes information identifying at least part of the at least one data item selected by the second device; and
   transmitting the at least part of the at least one data item to the second device based on the second unique code.

2. The method of claim 1,
   wherein the first unique code is encoded with at least one parameter associated with the first device, and
   wherein the at least one parameter comprises at least one of a unique security key, an address of the first device, or capability information of the first device.

3. The method of claim 1, wherein the first unique code comprises one of a bar code, and a quick response (QR) code.

4. The method of claim 1, wherein the generating of the first unique code comprises:
   selecting at least one type of the plurality of data items to be shared with the second device, based on the at least one input; and
   generating the first unique code for the at least one data item corresponding to the at least one type be shared with the second device.

5. The method of claim 1, wherein the scanning the second unique code comprises:
   triggering a data share event to transmit data corresponding to the at least part of the at least one data item encoded in the second unique code, to the second device.

6. The method of claim 5,
   wherein the second unique code is encoded with at least one parameter associated with the second device, and
   wherein the at least one parameter comprises at least one of a unique security key, an address of the second device, or capability information of the second device.

7. The method of claim 5, wherein the triggering of the data share event to transmit the data corresponding to the at least part of the at least one data item encoded in the second unique code comprises
   identifying the at least part of the at least one data item encoded in the second unique code.

8. A first device for sharing data with a second device, the first device comprising:
   a transceiver;
   a display; and
   at least one processor operatively coupled with the transceiver and the display,
   wherein the at least one processor is configured to control to:
      detect at least one input for at least one data item among a plurality of data items, wherein the plurality of data items are stored in the first device,
      generate a first unique code for the at least one data item in response to detecting the at least one input,
      display the first unique code for scanning of a second device, scan a second unique code displayed on the second device, wherein the second unique code includes information identifying at least part of the at least one data item selected by the second device, and transmit the at least part of the at least one data item to the second device based on the second unique code.

9. The first device of claim 8, wherein the first unique code is encoded with at least one parameter associated with the first device, and wherein the at least one parameter comprises at least one of a unique security key, an address of the first device, or capability information of the first device.

10. The first device of claim 8, wherein the first unique code comprises one of a bar code, and a quick response (QR) code.

11. The first device of claim 8, wherein the at least one processor is further configured to control to:

select at least one type of the plurality of data items to be shared with the second device, based on the at least one input, and generate the first unique code for the at least one data item corresponding to the at least one type to be shared with the second device.

12. The first device of claim 8, wherein the at least one processor is further configured to control to:

trigger a data share event to transmit data corresponding to the at least part of the at least one data item encoded in the second unique code, to the second device.

13. The first device of claim 12, wherein the second unique code is encoded with at least one parameter associated with the second device, and wherein the at least one parameter comprises at least one of a unique security key, an address of the second device, or capability information of the second device.

14. The first device of claim 12, wherein the at least one processor is further configured to control to:

identify the at least part of the at least one data item encoded in the second unique code.

15. A second device for triggering a data share event with a first device, the second device comprising:

a transceiver;

a display; and at least one processor operatively coupled with the transceiver and the display, wherein the at least one processor is configured to control to:

scan a first unique code from the first device, identify at least one data item for the first unique code, request at least a part of the at least one data item to the first device based on a second unique code that is generated by identifying the first unique code, and receive the at least a part of the at least one data item from the first device, in response to the request, wherein the first unique code is generated based on at least one input, detected in the first device, for the at least one data item among a plurality of data items, wherein the plurality of data items is stored in the first device, and wherein the second unique code indicates the at least part of the at least one data item selected by the second device.

16. The second device of claim 15, wherein the identifying of the at least one data item for the first unique code comprises identifying the at least one data item by decoding the first unique code based on a unique security key associated with the first device.

17. The second device of claim 15, wherein the at least one processor is further configured to control to:

display the at least one data item, generate the second unique code comprising at least one data item selected from the displayed at least one data item, and display the second unique code to be shared with the first device to trigger the data share event to receive data corresponding to the selected at least one data item from the first device.

18. The second device of claim 17, wherein the second unique code is encoded with at least one parameter associated with the second device, and wherein the at least one parameter comprises at least one of a unique security key, an address of the second device, or capability information of the second device.

19. The second device of claim 17, wherein the second unique code comprises one of a bar code, and a quick response (QR) code.

20. The second device of claim 17, wherein the at least one processor is further configured to control to:

display a list of types corresponding to the at least one data item for the first unique code, and select at least one type of data to be received from the first device, based on at least another input.

* * * * *